United States Patent
Jolly

(10) Patent No.: US 7,935,898 B2
(45) Date of Patent: *May 3, 2011

(54) PIVOTING OR RETRACTABLE CORD LID WITH CORD EXIT FOR FLOOR BOX

(75) Inventor: Robert Kevin Jolly, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 225 days.

This patent is subject to a terminal disclaimer.

(21) Appl. No.: 12/416,549

(22) Filed: Apr. 1, 2009

(65) Prior Publication Data

US 2010/0163301 A1 Jul. 1, 2010

Related U.S. Application Data

(60) Provisional application No. 61/141,913, filed on Dec. 31, 2008.

(51) Int. Cl.
*H02G 3/18* (2006.01)

(52) U.S. Cl. .......... 174/482; 174/64; 174/488; 439/138; 248/906

(58) Field of Classification Search .................. 174/482, 174/488, 480, 483, 50; 439/535, 142; 248/906; 220/4.02, 3.8, 3.6

See application file for complete search history.

(56) References Cited

U.S. PATENT DOCUMENTS

| | | | |
|---|---|---|---|
| 1,271,478 A | 7/1918 | Krantz | |
| 4,770,643 A | 9/1988 | Castellani et al. | |
| 5,783,774 A * | 7/1998 | Bowman et al. | 174/482 |
| 5,925,849 A | 7/1999 | Chen | |
| 6,175,078 B1 | 1/2001 | Bambardekar et al. | |
| 6,750,395 B2 | 6/2004 | Stout et al. | |
| 6,848,226 B1 * | 2/2005 | Boyd et al. | 52/220.8 |
| 7,183,503 B2 | 2/2007 | Bowman et al. | |
| 7,193,160 B2 * | 3/2007 | Dinh | 174/483 |
| 7,271,351 B2 * | 9/2007 | Drane | 174/483 |
| 7,511,231 B2 * | 3/2009 | Drane et al. | 174/483 |

OTHER PUBLICATIONS

Pending U.S. Appl. No. 12/416,494 to Robert Kevin Jolly entitled "Ultra Shallow Floor Box" filed Apr. 1, 2009.

* cited by examiner

*Primary Examiner* — Dhiru R Patel
(74) *Attorney, Agent, or Firm* — Hoffmann & Baron, LLP

(57) ABSTRACT

The present invention provides a floor box for electrical connectors, having: a body defined by a base and a perimetrical side wall, the body having an upper opening, the body configured for recessed mounting into a floor; a cover having a cover body and a cover lid, the cover configured to cover the upper opening to define a cord well therein; and at least one cord lid on the cover, the cord lid configured to pivot into the body when a cable is inserted into the body, wherein the body is adapted for accommodating electric fixtures therein.

15 Claims, 8 Drawing Sheets

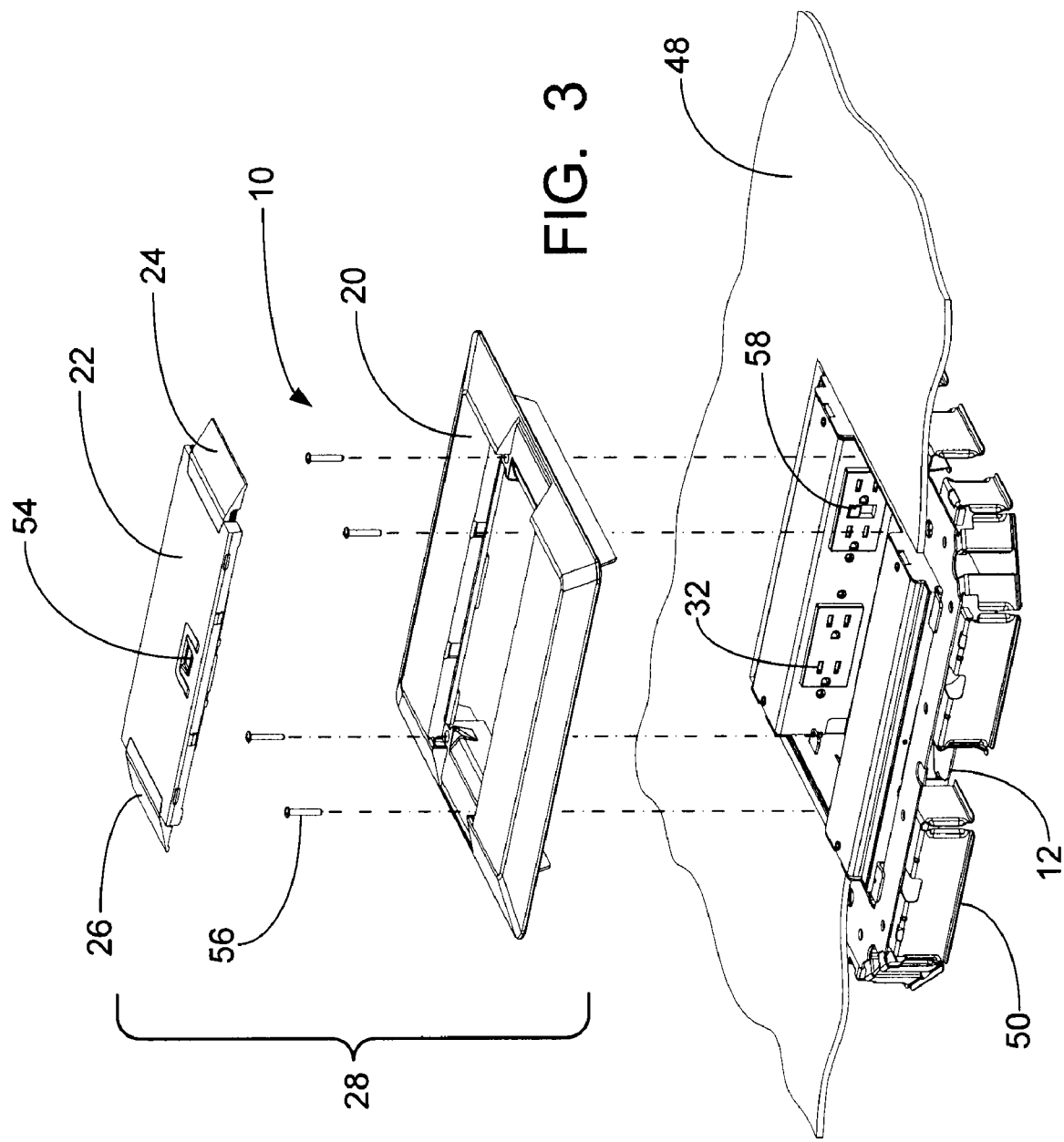

PIVOTING OR RETRACTABLE CORD LID WITH CORD EXIT FOR FLOOR BOX

CROSS REFERENCE TO RELATED APPLICATIONS

This application claims priority to U.S. Provisional Application No. 61/141,913 filed on Dec. 31, 2009, the contents of which are incorporated herein by entirety.

FIELD OF THE INVENTION

The present invention relates generally to floor boxes for housing electrical connectors and junctions. Specifically, the present invention relates to novel electrical floor boxes with pivoting/retractable cable lids and/or ultra-shallow floor boxes which may have a sloping cord exit to promote cord exit which is parallel with and tangent to a finished floor.

BACKGROUND

Existing conventional floor boxes are designed so that the electrical device is located above the floor, below the floor (such as in a recessed floor box), or equal to or nearly equal in elevation to the top of the floor surface. Typically, these electrical floor devices are oriented so that the outlet face is parallel to the floor surface and is closed off by a cap or thin lid when not in use. These types of typical device or floor boxes cannot be used in ultra-shallow floors due to the height of the electrical box or electrical device, except when the device is completely installed above the top surface of the floor. This, in turn, creates a trip hazard.

SUMMARY OF THE INVENTION

An aspect of the present invention provides a floor box for electrical connectors, having: a body defined by a base and a perimetrical side wall, the body having an upper opening, the body configured for recessed mounting into a floor; a cover having a cover body and a cover lid, the cover configured to cover the upper opening to define a cord well therein; and at least one cord lid on the cover, the cord lid configured to pivot into the body when a cable is inserted into the body, wherein the body is adapted for accommodating electric fixtures therein.

Another aspect of the present invention provides a floor box for electrical connectors, having: a body defined by a base and a perimetrical side wall, the body configured for partially recessed mounting into a floor, the body having an upper opening and a portion of the perimetrical side wall that are raised above the floor; and a cover having a cover body and a cover lid, the cover configured to enclose the upper opening and the raised portion of the perimetrical side wall to define a cable well therein, the cover closing over the upper opening and the perimetrical side wall to provide a sloped gradient to a surface of the floor, wherein the body is adapted for accommodating electrical fixtures.

Still another aspect of the present invention provides a floor box for housing electrical connectors, having a body defined by a base and a perimetrical side wall, said body configured for partially recessed mounting into a floor, said body having an upper opening and a portion of the perimetrical side wall that is raised above said floor; a floor box cover, including a cover body and a cover lid, said cover configured to enclose said upper opening to define a cable well therein, said cover having an angled edge such that said cover has an angled gradient over said exposed portion of the perimetrical side wall to said floor; and at least one cord lid on said cover lid, said cord lid configured to pivot beneath said cover lid into said body when a cable is inserted into the body.

The present invention and various embodiments thereof may be better understood through a study of the drawings and detailed description which follows.

BRIEF DESCRIPTION OF THE DRAWINGS

FIG. 3 depicts an exploded perspective view of an ultra shallow floor box of the present invention.

DETAILED DESCRIPTION OF THE DRAWINGS

Figure 1A:
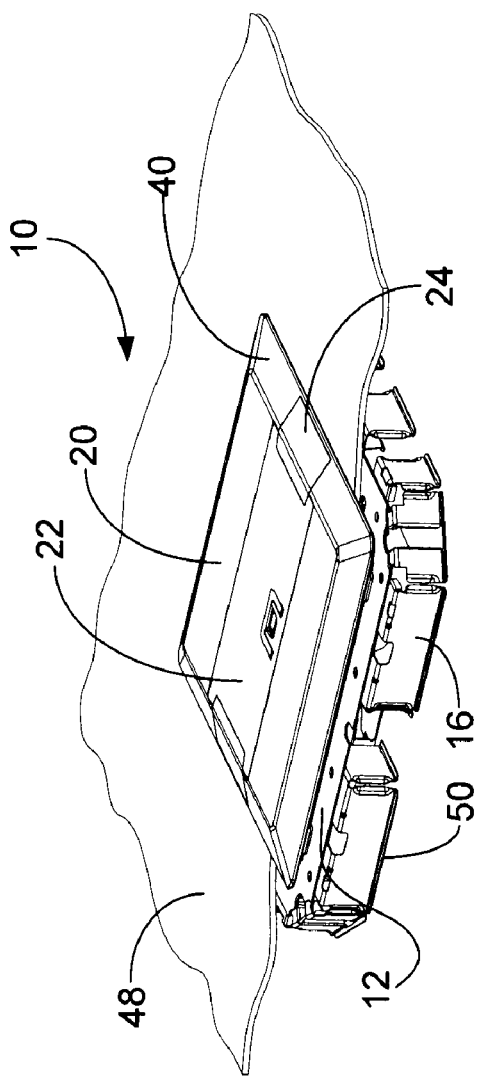
FIG. 1A depicts a perspective view of a raised floor box of the present invention in a closed position.
Figure 1B:
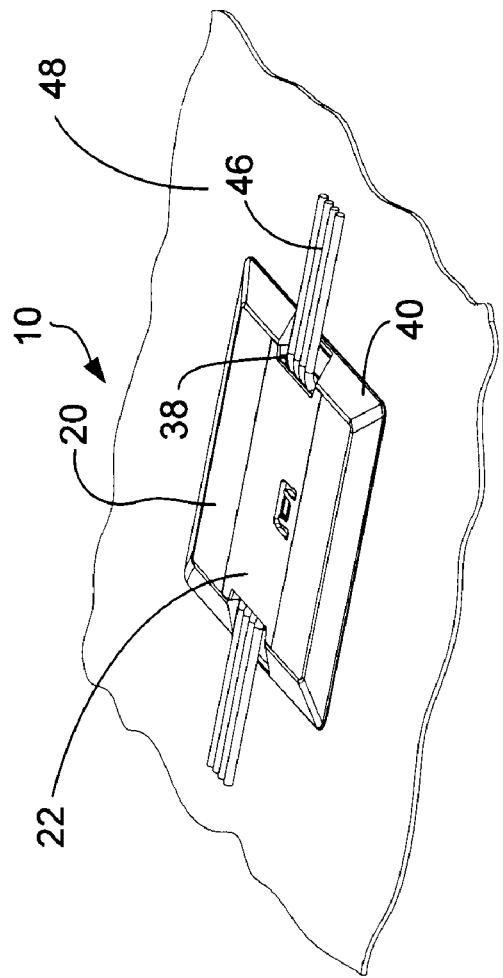
FIG. 1B depicts a perspective view of a raised floor box of the present invention with cables exiting from the floor box.
Figure 2A:
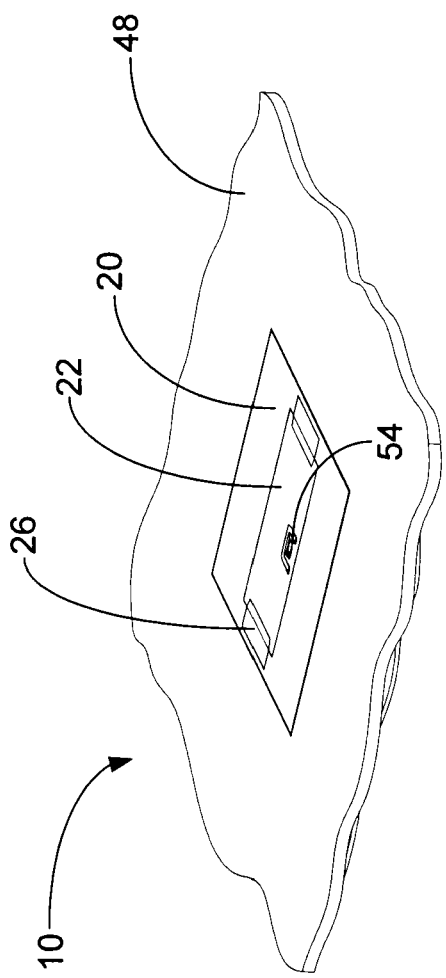
FIG. 2A depicts a perspective view of a flat floor box of the present invention in a closed position.
Figure 2B:
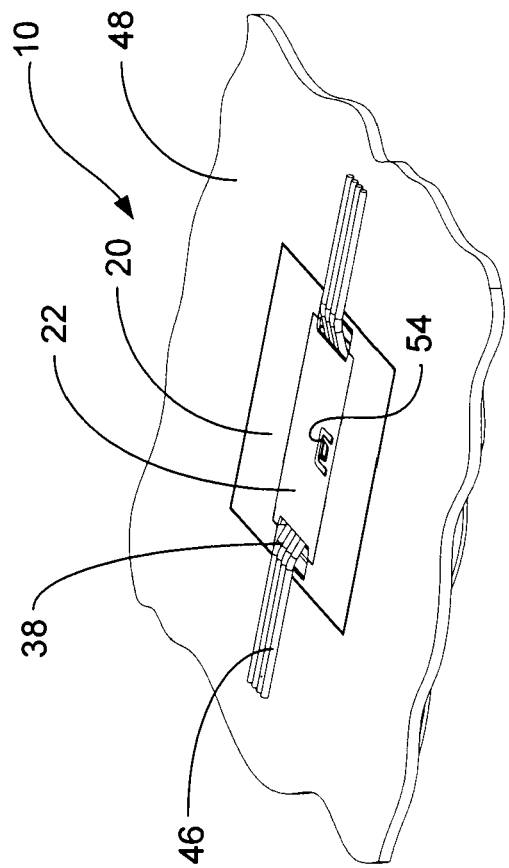
FIG. 2B depicts a perspective view of a flat floor box of the present invention with cables exiting from the floor box.
Figure 4:
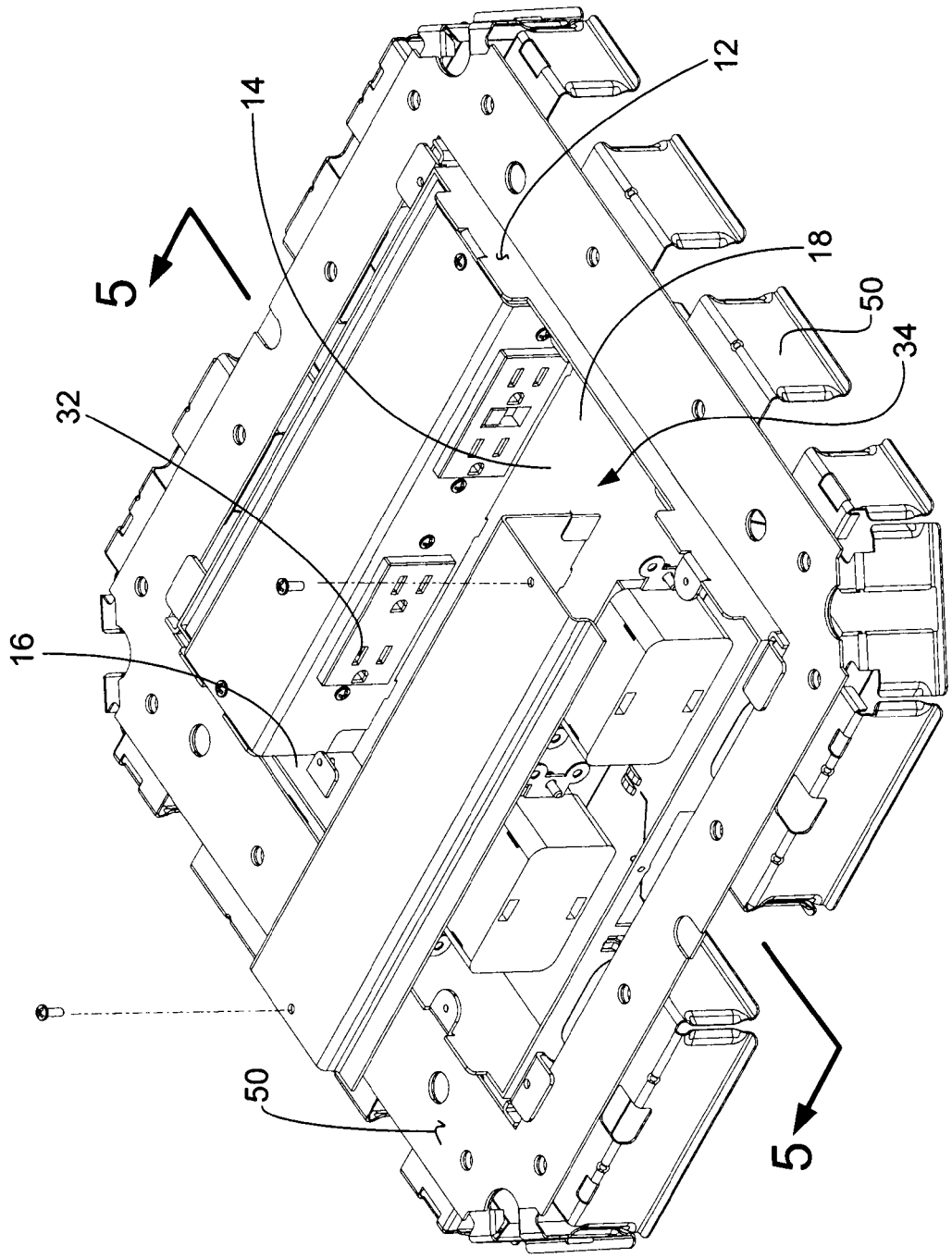
FIG. 4 depicts another perspective view of a floor box of the present invention, shown without the cover body or cover.

The various embodiments of floor box connectors of the present invention solve the problems of previous floor boxes by reducing or eliminating the possibility of a trip hazard, covering the majority of the upper opening of the floor box when cords and/or cables are plugged in, and/or by having an ultra shallow design which may accommodate the retrofitting of older buildings with electrical outlets in compliance with building codes and zoning regulations. The reference numerals set forth herein are common throughout and may be depicted in one or more of the drawings.

According to the Figures, a floor box 10 for electrical connectors is shown. The floor box 10 generally includes a body 12 and a cover 28. The body 12 is defined by a base 14 and a perimetrical side wall 16. The body 12 may be in one or more shapes, as may be desired. The body 12 is defined by a base 14 and a perimetrical side wall 16. The body 12 may be in one or more shapes, as may be desired. The cover 28 may be attached to the body 12 by one of more means of attachment, as may be desired. For example, the cover 28 may be pushed onto the cover. As another example, the may be snapped onto the body 12 by catch points on the cover 28 and body 12 that conform and retain the cover 28 onto the body 12. As still another example, the cover 28 may fit onto the body 12 such that screws, nails, or other attachment devices 56 may attach the cover to the body. Alternatively, one or more parts may be integrally formed or alternatively attached to form the floor box 10 prior to installation. The body 12 is configured for recessed mounting into a floor. Floor, as used herein, may refer to the finished surface 48 of a floor, a raised floor 50, or a sub-floor 52, as may be desired.

The perimetrical side wall 16 surrounds the base to create an upper opening 18 to the floor box 10. The upper opening 18 of the body 12 may provide user access to the interior of the body 12 as well as the contents which may be housed therein. The body may be adapted for accommodating one or more electrical connectors. Thus, such contents may include at least one electrical connector 32.

The electrical connector 32 may be configured to provide power in the body 12. The electrical connector 32 may be an electrical socket, an Ethernet or a phone/data cable connection, communication cable, or some such other device as may be desired. Further, the electrical connector 32 is desirably configured or otherwise supported by the perimetrical side wall 16 of the body 12.

The cover 28 may include a cover body 20 and a cover lid 22. The cover body 20 and cover lid 22 may cooperate to cover and enclose the upper opening 18 of the body 12 and enclose or encase the at least one electrical connector 32 therein. With the cover body 20 and the cover lid 22 in place, a cord well 34 may be defined and/or created within the body. The cord well 34 may refer to an area of space within the body 12, beneath the covered upper opening 18 where one or more cords and/or cables 46 which are plugged into the at least one electrical connector 32 may be retained.

The cover lid 22 may be removably attached to the cover body 20. Desirably, the cover lid 22 may be attached to the cover body 20 by a cover hinge 30. The cover hinge 30 may be attached to the cover lid 22 at one or more areas on, for example, a side of the cover lid 22, connecting the cover lid 22 to a side of the cover body 20. In such a fashion, the cover lid 22 may be swung upward into an open position, using for example, a cover handle 54, to allow a user access to the contents of the body 12.

One or more various embodiments of the floor box 10 components, including the body 12, cover 28, and the like may be composed of one or more materials, as may be preferred. Such materials may include, for example, metal, polymer, polyurethane, plastic, and combinations of these materials. Other materials may also be used, as may be desired.

The floor box 10 may be configured for a recessed mount into the uppermost floor 48 surface. When recessed within the floor 48, the floor box 10 may be recessed such that the cover body 20 and cover lid 22 are flush with the floor 48. This is shown, for example, in FIGS. 2A, 2B, and 8A through 8C. Also, the floor box 10 may be recessed only into the floor 48 such that the cover body 20 and cover lid 22 raise, preferably, only a small distance above the floor surface 48. This is shown, for example, in FIGS. 1A, 1B, and 7A through 7C. In such a configuration, the cover body 20 may be configured to include an angled perimetrical edge 40. The angled edge 40 may create an acute angle with the floor 48. The angled edge 40 and the short distance that the cover body 20 and cover lid 22 raise above the floor may both desirably reduce the possibility that the floor box 10 in a slightly raised manner may act as a trip hazard. In a similar fashion, the cover 28, including one or more portions of the cover lid 22 and the cover body 20, may be configured in sloped or slanted configuration to create a raised dome-like cover to the body 12.

Optionally, the cover lid 22 may further include at least one cord lid 24. While the Figures depict the cover lid 22 with two cord lids 24, one or more may be used, as may be desired. The cord lid 24 may be configured to pivot into the body 12 of the floor box 10 when a cable or cord 46 may be inserted into the body 12, as is typically done to connect the cable 46 to the electrical connector 32. The cord lid 24 may pivot underneath the bottom or inner surface of the cover lid 22 in order to maintain a low profile and prevent user interference with the cords 46 that are plugged into the floor box 10.

The cover lid 22 may be opened up and away from the cover body 20 in order to allow one or more cords or cables 46 to be connected to the electrical connectors 32, where the electrical connectors 32 may be desirably located along the perimetrical side wall 16 of the body 12. The cord lids 24 may be swung up, towards the underside of the cover lid 22 prior to closing the cover lid 22 onto the cover body 20 to enclose the connected cables or cords 46 within the cable well 34. The opened cord lids 24 may create a cable path 38, which is defined by the cover lid 22 and the cover body 20.

Figure 6:
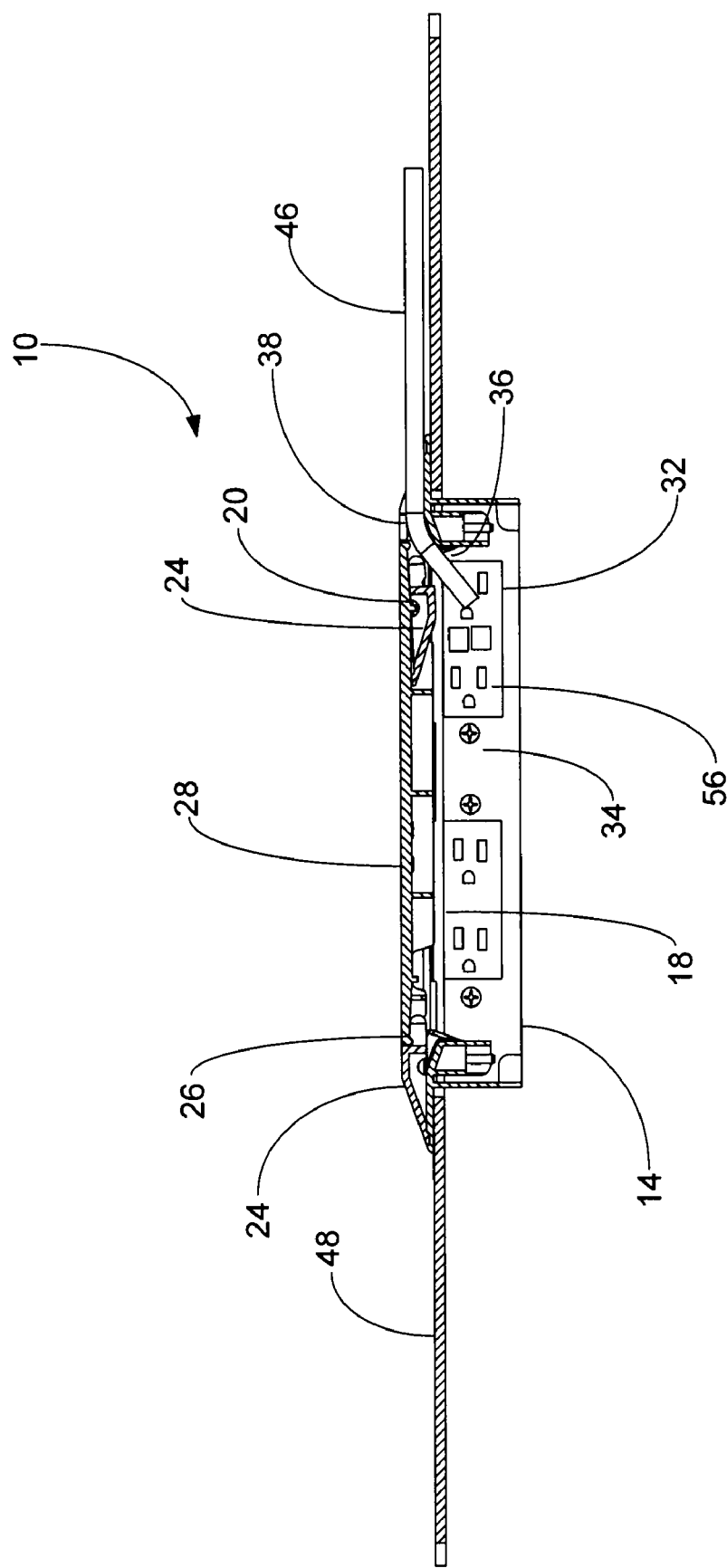
FIG. 6 depicts a cut-away side view the floor box of the present invention with cables entering the floor box.

One or more cords or cables 46 may enter the floor box 10 through the cable path 38 with a gentle slope into the cable well 34 by the body recess 36. As stated, the body recess 36 may be either stepped in nature, sloped with a gradual change, or a combination of both stepped and sloped recess. As the cord or cable 46 is plugged into the electrical connector 32 along the perimetrical side wall 16 of the body 12, the cable well 34 and body recess 36 allow the cable to exit the floor box in a position substantially parallel with the floor 48 (shown, for example, in FIGS. 1B, 2B, and 6). This greatly reduces the hazard of a trip from a cord or cable 46 plugged into the floor box 10.

The cord lid 24 on the cover lid 22 may further include a cord lid hinge 26. The cord lid hinge 26 may be configured to allow the cord lid 24 to swing towards and underneath the cover lid 22. The cord lid hinge 26 may be configured to move only in response to a predetermined amount of force. For example, the cord lid 24 may be configured such that it may be manipulated or moved by a user to an open position and that position is maintained until moved again. Thus, the cord hinge 26 may be partially moved towards the cover lid 22 and retained in partially opened configuration to allow the cord 46 to enter the body 12, but to closely cover the cable 46. In such a manner, the cord lid 24 may be used to apply pressure to the cable 46 to promote cable exit 46 substantially parallel with the floor 48 surface.

Optionally, the cord lid 24 may further include a retaining means 58. The retaining means 58 may take one or more forms, as is known, in order to retain the cord lid 24 in a position substantially adjacent to the inner surface of the cover lid 22. Thus, the retaining means 58 may keep the cord lid 24 in an open configuration until or unless the retaining means 58 is released. The retaining means 58 may be a hook and loop, spring latch, friction, or the like. The retaining means 58 may act on the cord lid 24 to maintain the cord lid 24 in an open position, further defining the cord path 38. Thus, when a cord or cable 46 is plugged into the floor box 10 electrical connector 32, the cord lid 24 may be in a partially open position, or retained by retaining means 58 in an open position. When no cord or cable is plugged into the floor box 10, the cord lids 24 may remain in a closed position to prevent contaminants and other unwanted materials from entering the floor box 10 and or from contacting the electrical connectors 32.

Figure 7A:
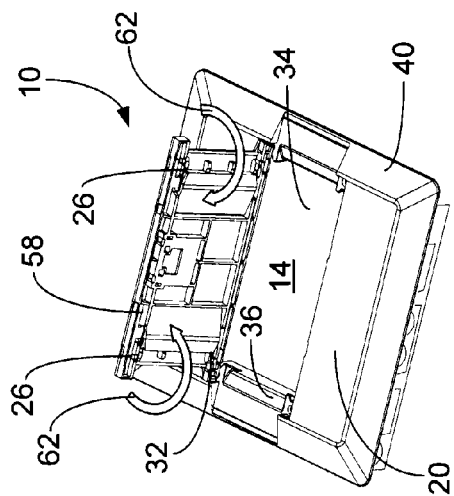
FIG. 7A depicts a perspective top view of a raised floor box with cord lid portions on the cover of the floor box, the lids in a closed position.
Figure 7B:
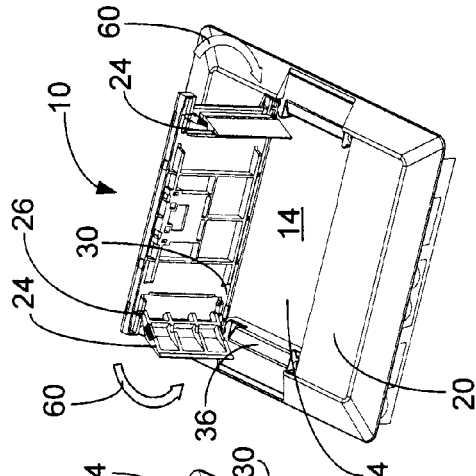
FIG. 7B depicts a perspective top view of a raised floor box with cord lid portions on the cover of the floor box, the lids in a partially open position.
Figure 7C:
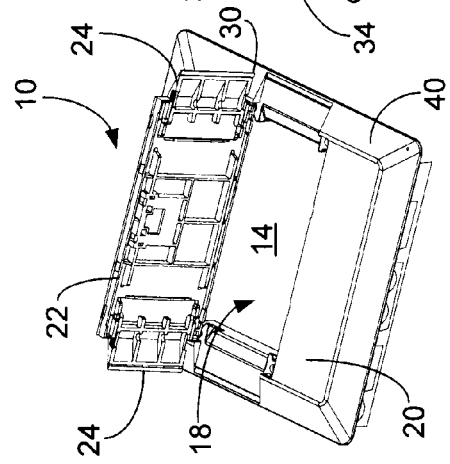
FIG. 7C depicts a perspective top view of a raised floor box with cord lid portions on the cover of the floor box, the lids in an open position.

FIGS. 7A through 7C depict the cord lid 24 of a raised floor box (floor box with cover slightly above the floor surface) at various stages. FIG. 7A depicts the cover lid 22 in an open position, which provides a user actuatable access to the cord lids 24. FIG. 7B illustrates the cord lids 24 being moved from the previous position (closed), to a partially open position. The arrows labeled 60 depict the inward swinging movement of the cord lids 24. FIG. 7C depicts the cord lids in a completely opened position, held in place by retaining means 58. The arrows 62 depict the movement of the cord lids 24 inward to the retained position. Also, the body recess 36 of the floor box 10 is depicted as a sloped recess.

Figure 8A:
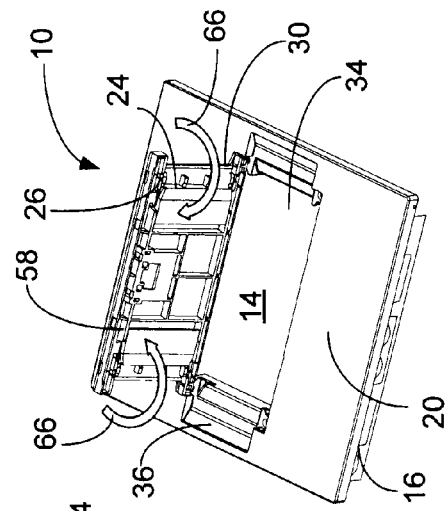
FIG. 8A depicts a perspective top view of a flat floor box with cord lid portions on the cover of the floor box, the lids in a closed position.
Figure 8B:
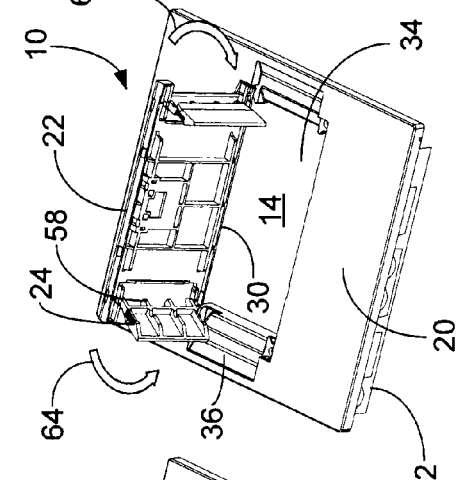
FIG. 8B depicts a perspective top view of a flat floor box with cord lid portions on the cover of the floor box, the lids in a partially open position.
Figure 8C:
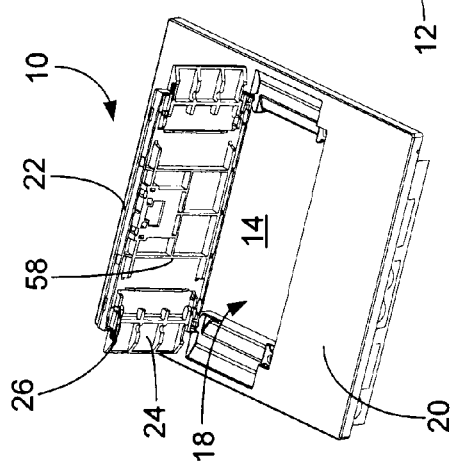
FIG. 8C depicts a perspective top view of a flat floor box with cord lid portions on the cover of the floor box, the lids in an open position.

FIGS. 8A through 8C depict the same stages of the cord lids 24 as in FIGS. 7A through 7C, but with a floor box 10 which is 'flat', or flush with the floor. FIG. 8A depicts an opened cover-lid 22 which provides access to the cord lids 24. FIG. 8B depicts the cord lids 24 in a partially moved or posed position, with arrows 64 depicting the movement inwards. FIG. 8C depicts the cord lids 24 in a completely opened position, retained by retaining means 58 (arrows 66 depicting inward motion from initial closed position to the opened position). It should be noted that the body recess 36 depicted in FIGS. 8A through 8C are a stepped configuration leading into the cable well 34.

Figure 5:
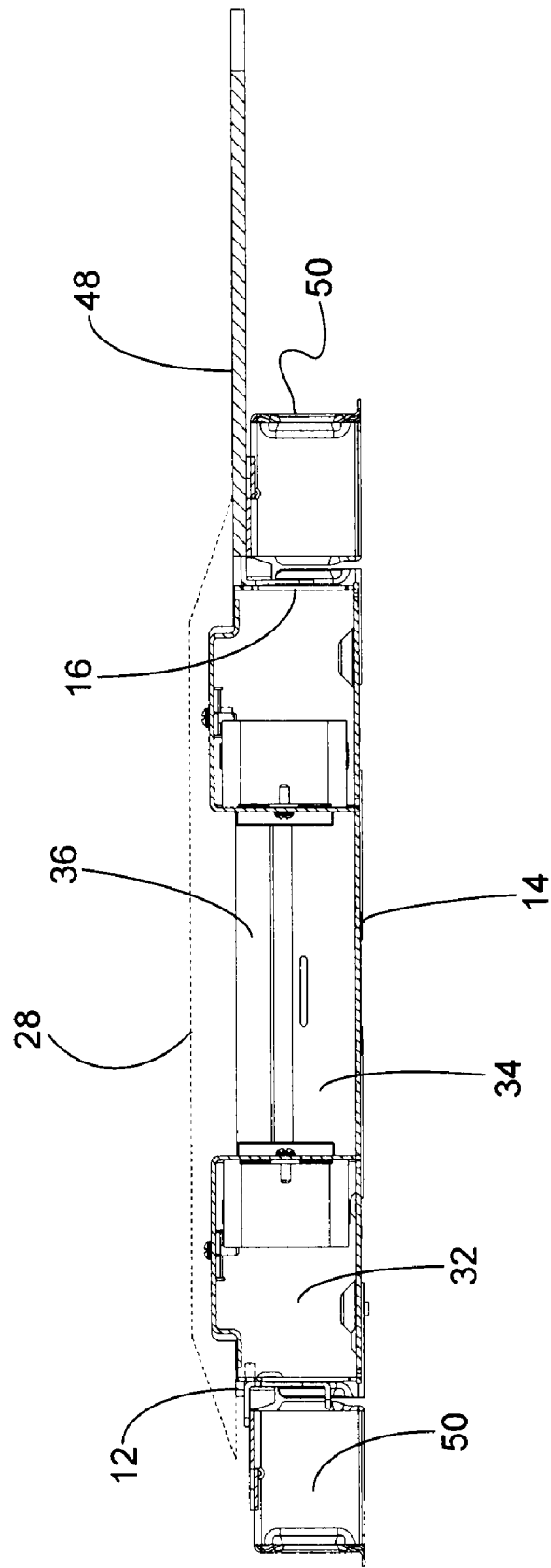
FIG. 5 depicts a cut-away side view of FIG. 4, taken along the 5-5 axis.

In another embodiment, the body 12 of the floor box 10 may be an ultra shallow configuration. In such a configuration, the body 12 of the floor box 10 may be partially recessed into the floor 48 such that the floor 48 is generally perpendicular to the perimetrical side wall 16, with a portion of the perimetrical side wall 16 exposed, or raised, partially above the floor 48. Thus, only a portion of the perimetrical side wall 16, and thus, the body 12, lies below the surface of the floor 48. This is depicted, for example, in FIG. 5, which shows the perimetrical side wall 16 and/or part of the electrical connector 32 above the surface of the floor 48. Also, this is clearly depicted with a sub-floor 52 and raised floor 50 in FIG. 9.

When the floor box 10 is in the ultra shallow configuration, the cover 28 may be configured with an angled perimetrical edge 40 to cover the exposed portion of the perimetrical side wall 16 and the upper opening 18. Similarly, the angled edge 40 may be applied to the perimetrical side wall 16, which may angle up towards the cover 28. As such, the ultra shallow floor box configuration may allow for an electrical connector 32 to sit partially recessed into the floor 48 such that the floor box 10 takes up a small portion of space beneath the floor 48.

Figure 9:
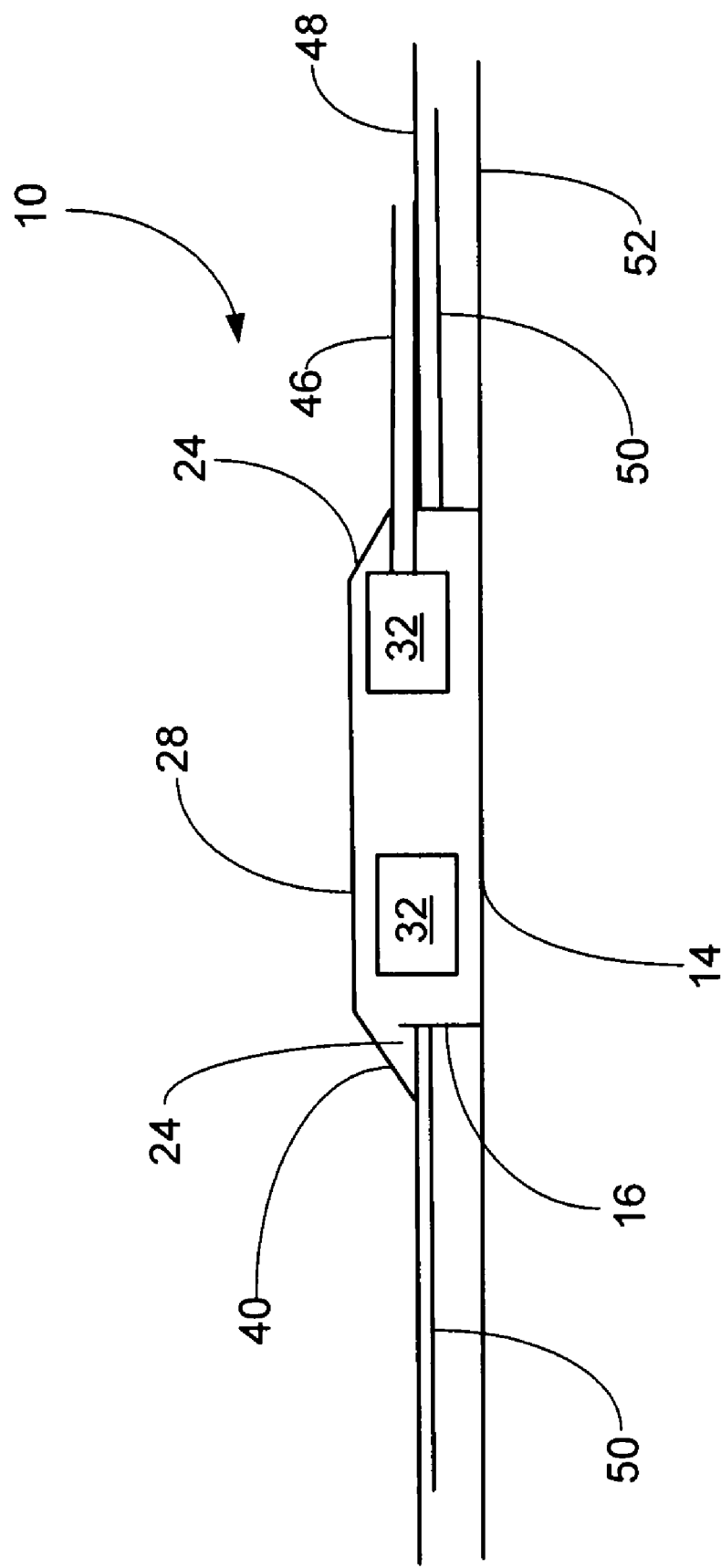
FIG. 9 depicts a cut-away side view of a floor box with an ultra-shallow configuration, in situ, depicting both a sub-floor and a raised floor.

It is desirable to have an ultra shallow floor box when the floor surface 48 is a raised floor 50, which lies above a sub-floor 52 (see, e.g. FIG. 9). This is typically the case when an older building is being retro-fitted, and requires a smaller than normal raised floor installation. For example, this is commonly the case when older buildings need to be fitted to comply with a lot of electrical equipment, multiple computer terminals, or many telephone terminals in use.

As ceiling heights in buildings are fixed, there is a need to raise the floor as little as possible in order to comply with building codes which require ceiling heights not less than a certain height as well as minimum floor loading. When the heights of the new, raised floors must be only slightly higher than the sub-floor in order to comply with building codes, the height of standard electrical boxes is problematic. In such cases, the standard height electrical floor boxes must stand quite a distance above the raised floor 50. As such, a tripping hazard is created for each of the electrical floor boxes throughout the building.

With the electrical floor box 10 of the present invention, the body 12 and/or the cover 28 are positioned such that the top of the floor box 10, its horizontal surface parallel to the top surface of the finished floor 50, is at a slightly higher elevation than the raised floor 50. Also, as previously discussed, the electrical connector 32 may be positioned along the side of the perimetrical side wall, or at an angle within so that a corner or any portion of the electrical connector 32 is positioned at an elevation higher than that of the top of the floor surface. This configuration may also promote cord 46 exit substantially parallel to the floor 48 surface.

Thus, the floor box in the ultra shallow configuration solves the problem of raised floor systems (raised floor over sub-floor) that may have a vertical height less than that of traditional floor boxes. The floor box 10 in the ultra-shallow configuration effectively and efficiently accommodates a shallow floor depth. This is because the depth of body 12 is about the same as the depth of electrical connector 32. In some cases, the depth of electrical connector 32 is greater than sidewall 16. Further, this body 12 is intended for instances where the distance between raised floor 50 and sub-floor 52 is less than the depth of traditional floor boxes and/or less than or nearly equal to the depth of traditional electrical connectors 32.

The floor box 10 in an ultra shallow configuration has the specific advantage of meeting the requirements for placing an electrical device box (via a floor box) into an ultra shallow floor. The same floor box 10 can also be used with deeper floors greater than the depth of the floor box. When used with deeper floors, the floor box 10 of the present invention still remains close to the top, raised floor 50, for easy access to the electrical devices when plugging electrical cords 46 into the floor box 10. As such, the floor box 10 may be used in conjunction with a shallow-depth concrete floor or raised floor such that the floor depth is smaller than the typical dimensions required for an electrical floor box or an electrical device box.

One or more of the elements and features described herein may be used in combination; the above-referenced embodiments do not serve as a limit to the elements and features employable herewith. While various embodiments of the present invention are specifically illustrated and/or described herein, it will be appreciated that modifications and variations of the present invention may be effected by those skilled in the art without departing from the spirit and intended scope of the invention. Further, any of the embodiments or aspects of the invention as described in the claims or throughout the specification may be used with one and another without limitation.

What is claimed is:

1. A floor box for electrical connectors, comprising:
    a body defined by a base and a perimetrical side wall, said body having an upper opening, said body configured for recessed mounting into a floor, said body adapted for accommodating electric fixtures therein;
    a cover having a cover body and a cover lid, said cover configured to cover said upper opening, said cover and said body defining a cord well within said body; and
    at least one cord lid on said cover, said cord lid configured to pivot into said body forming a cable path in communication with the cord well when a cable is inserted into said body.

2. The floor box of claim 1, further comprising a cover body hinge configured to connect to said cover body and said cover lid to provide pivoting movement of said cover lid.

3. The floor box of claim 1, further comprising a cord lid hinge configured to said cover lid and said cord lid to adapt said cord lid to pivot.

4. The floor box of claim 1, further comprising at least one recess in said body, said recess adjacent to said cord lid to define the cable path when said cord lid is pivoted.

5. The floor box of claim 1, further comprising a retaining means on an inner surface of said cover lid to retain said lid in an open position.

6. The floor box of claim 1, wherein said cover lid and said cover body are flush with an upper surface of said floor.

7. The floor box of claim 1, wherein said cover lid and said cover body close over said upper opening of said body in a raised position from an upper surface of said floor.

8. The floor box of claim 1, further comprising an angled perimetrical edge of said cover body to provide a slanted surface to said floor.

9. The floor box of claim 1, wherein said body is partially recessed into said floor such that a first portion of said perimetrical side wall of said body extends above the floor and is substantially perpendicular with said floor, further wherein a second portion of the perimetrical side wall extends below said floor.

10. The floor box of claim 1, wherein said body is composed of a material selected from a group consisting of: metal, polymer, polyurethane, plastic, and combinations thereof.

11. The floor box of claim 1, wherein said cover is composed of a material selected from a group consisting of: metal, polymer, polyurethane, plastic, and combinations thereof.

12. The floor box of claim 1, further comprising at least one electrical connector disposed within provide power in said body, said electrical connector configured to said body.

13. The floor box of claim 12, wherein said at least one electrical connector is supported by said perimetrical side wall of said body such that said electrical connector is configured to face the cord well within said body.

14. The floor box of claim 1, wherein an electrical cord inserted into the body is configured by the body to exit therefrom in a position substantially parallel to an upper surface of the floor.

15. A floor box for housing electrical connectors, comprising:
   a body defined by a base and a perimetrical side wall, said body is configured for partially recessed mounting into a floor, said body having an upper opening and a portion of the perimetrical side wall that is raised above said floor;
   a floor box cover, including a cover body and a cover lid, said box cover is configured to enclose said upper opening to define a cable well within said body, said box cover having an angled edge such that said box cover has an angled gradient over said exposed portion of the perimetrical side wall to said floor; and
   at least one cord lid on said cover lid, said cord lid is configured to pivot beneath said cover lid into said body to create a cable path in communication with the cable well when a cable is inserted into the body.

* * * * *